March 4, 1969     G. B. CLARK ET AL     3,430,770

REVERSE OSMOSIS APPARATUS

Filed Nov. 21, 1966

INVENTORS.
GEORGE B. CLARK
SEROP MANJIKIAN
BY

Agent

United States Patent Office 3,430,770
Patented Mar. 4, 1969

3,430,770
REVERSE OSMOSIS APPARATUS
George B. Clark, Poway, and Serop Manjikian, Del Mar, Calif., assignors to Universal Water Corporation, Del Mar, Calif., a corporation of California
Filed Nov. 21, 1966, Ser. No. 595,900
U.S. Cl. 210—321　　　　　　　　　　　　　　　8 Claims
Int. Cl. C02b 1/74, 1/82

ABSTRACT OF THE DISCLOSURE

A module for treating solutions by reverse osmosis comprises a number of backing tubes containing tubular membranes arranged in side-by-side relationship. Flanges, preferably of plastic, are cast around the ends of the tubes and these flanges contain flared bores communicating with the tube bores and which are overlaid with flared membrane ends. End plates, preferably containing connecting channels, are fastened to the flanges with O-ring seals between the end plates and the flared membrane ends.

---

This invention relates to apparatus for treating a solution by reverse osmosis. It contemplates a module comprising a plurality of porous backing tubes, lined with semipermeable membranes and with end flanges and seals which incorporate tube connections. In a specific and important embodiment the backing tubes are fabricated of plastic, the ends of the tube or tubes being circumferentially grooved to increase bonding surface area and mechanical grip with end flanges cast around the tube ends. The module is particularly advantageous for use in reverse osmosis systems since it is efficient, compact and plastic materials can be obtained which are substantially inert to solutions being treated and do not corrode or contaminate a purified solution product. Stainless steel or other corrosion resistant alloy may be employed for construction of backing tubes and may be required when operating under extremely high pressure, but a plastic module, surprisingly, can be constructed, according to our design, to withstand internal solution pressures in the range at present thought desirable for desalination, for example, of sea water. Plastic materials of construction are considerably less expensive than corrision resistant alloys, both in their material cost and in cost for drilling, machining and other required fabrication.

In a typical reverse osmosis process, a solution containing a dissolved or dispersed solute is passed at hyperatmospheric pressure through apparatus which contains a semipermeable membrane. Often the apparatus employed is provided with an elongated passageway lined with the semipermeable membrane through which the solution under pressure flows. The reverse osmosis process results in a portion of the original solution, which passes through the membrane, being purified with respect to the solute originally contained in the solution and this portion is termed the dilute; the remainder of the solution becomes correspondingly more concentrated with respect to such solute and is termed the concentrate.

Pressures required to obtain efficient operation may vary from 50 to 1000 pounds per square inch when treating brackish water or solutions containing low concentrations of solutes, to as high as 1000 to 2000 pounds per square inch when treating sea water and other solutions containing relatively high solute contents. Additionally, high pressure is often required to provide driving force to insure acceptable output for commercial operation. Design of reverse osmosis apparatus, therefore, must take into account the pressures employed in the process, and also the corrosive nature of many solutions. Production of potable water from sea water, for example, requires operation of the reverse osmosis process at a pressure in the range of 1,000 to 2,000 pounds per square inch and the corrosive nature of sea water is well known. In addition to mechanical considerations, corrosion resistance is important from the standpoint of product purity, since contamination of the purified solution by corrosion products could destroy the value of an otherwise efficient purification system.

Since water is a low-priced commodity, all factors entering into the cost of water purification must be considered. Due to the specific requirements, particularly with respect to corrosion resistance of construction materials, and size necessary to produce water in amounts of the order of many thousands of gallons per day, the initial cost of water treatment plants and equipment is a substantial factor in the final purified water cost. The problems therefore are to provide reverse osmosis equipment suitable for use with corrosive solutions, which will withstand the high pressures necessary for efficient commercial operation, and which can be produced at reasonable cost.

The foregoing problems are solved according to this invention by providing a plurality of backing tubes lined with semipermeable membranes and which are assembled into modules with unique end flanges and end plates. Design and operation of the apparatus of this invention will become apparent from the following more detailed description thereof and by reference to the drawings in which.

Figure 1:
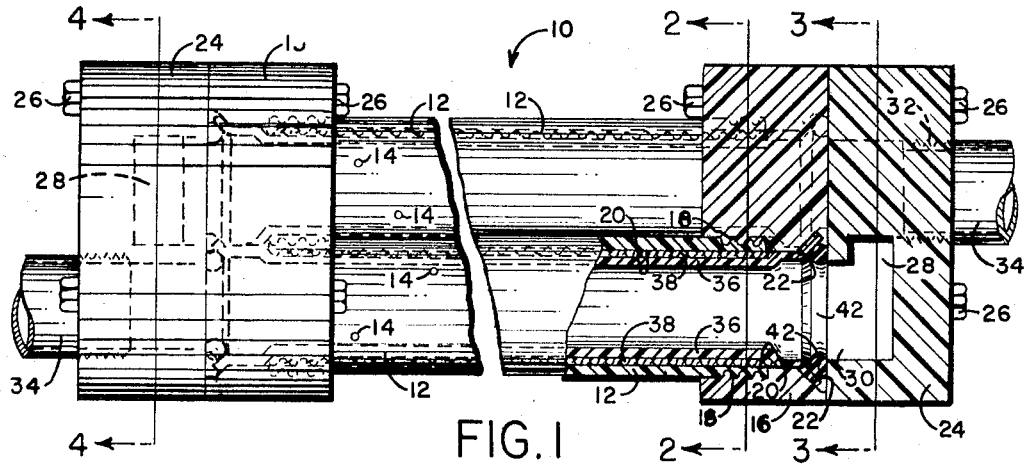
FIG. 1 illustrates a side view of a module incorporating features of this invention, partly broken out at one end to show a central, longitudinal, vertical section.
Figure 2:
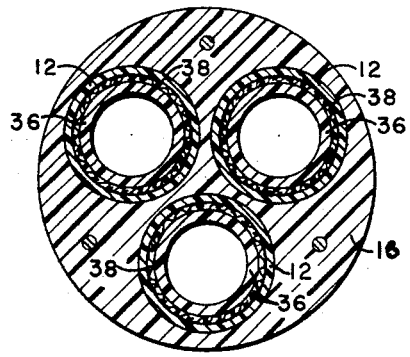
FIG. 2 illustrates a transverse vertical section of the module of FIG. 1 taken along the line 2—2.
Figure 3:
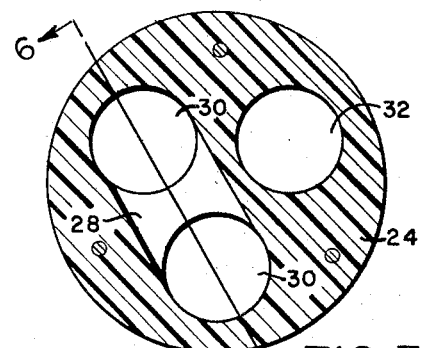
FIG. 3 illustrates a transverse vertical section of the module of FIG. 1 taken along the line 3—3.
Figure 4:
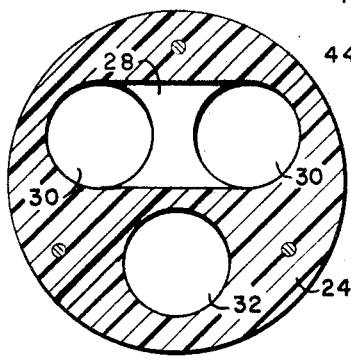
FIG. 4 illustrates a transverse vertical section of the module of FIG. 1 taken along the line 4—4.

Referring now to FIGS. 1 to 4, the module 10 comprises a plurality of tubular porous bodies 12 of which three, for example, are shown arranged in side by side relationship. It will be understood that a plurality, that is at least two, of such bodies are employed and may be used to provide the desired length of membrane lined passageway provided by such membrane lined tubular bodies when connected by end flanges and plates as hereinafter described. A module containing 19 or 38 such bodies will be found to be compact and efficient, since such number of tubular bodies may be compactly grouped within circular end flanges. However, for ease of understanding and clarity, a three tube module has been shown in the drawings. The same design concept applies to modules with a greater number of tubes.

Tubular bodies 12 are fabricated of suitably strong and corrosion resistant material and are rendered porous for transport of liquid therethrough by holes 14 penetrating their walls at spaced intervals. Holes 14 are of diameter preferably about $\frac{1}{32}$ inch to provide adequate liquid transfer without being so large as to allow deleterious distortion of membrane or membrane backing fabric. They are spaced apart longitudinally along the tubular bodies and circumferentially around them.

The end portions of bodies 12 are fixedly attached, as by adhesive bonding, to unitary end flanges 16. This is accomplished by casting each of the flanges 16 en bloc around the ends of tubular bodies 12, the casting composition being preferably a catalytic setting synthetic resin. An advantageous composition consists essentially of an epoxy resin containing aluminum powder filler to which is added a suitable catalyst or hardener. Commercial products useful for this purpose are Hysol casting compound C9–4351, Hysol resin R9–2039, and Hysol catalyst #3561. These are taken respectively in amounts of 4 parts, 2 parts, and 1 part, all by weight. Such a combination will adhere well to plastic tubes and produce a strong, corrosion resistant end flange. For stainless steel tubes, better adhesion is obtained by substituting Epon 815 resin and Hysol H8–3485 catalyst and the proportions are: casting compound 84 parts, resin 9 parts, and catalyst 7 parts, all by weight. The Epon resin is sold by Shell Chemical Corp. and the Hysol products by Hysol Corp. of Olean, N.Y.

Backing tubes 12 are fabricated of suitable material having required strength and other characteristics. Stainless steel may be employed where high pressures are used and its cost and fabrication expense can be tolerated. Plastic tubing is excellent, providing the type of plastic is properly selected and it should have a tensile strength of at least 2,000 pounds per square inch. A commercial plastic known as ABS Polymer is advantageous. These initials stand for acrylonitrile-butadiene-styrene and the polymer is a combination of these ingredients. ABS is dimensionally stable, strong, and resistant to corrosion by saline water. A suitable specific composition is marketed by Borg Warner Corp. of Washington, W. Va. as X–27 and is characterized by tensile strength (1 inch thickness) of 4,600 pounds per square inch and deformation under load of .21 (24 hrs., 122° F., 2,000 p.s.i.). It is almost completely resistant to aqueous acids, alkalis and salts. This and similar material can readily be extruded to produce tubing of desired size.

The end portions of backing tubes 12, where they are adhesively attached to end flanges 16, may be circumferentially grooved as at 18 and this will provide improved bonding surface area and mechanical grip particularly when the backing tubes 12 are fabricated of plastic. End flanges 16 are provided with bores 20 which are aligned with each of the backing tubes 12 and which also act as continuations through flange 16 of the interior bores of backing tubes 12. The outer portions of bores 20, that is the ends opposite to those connected with backing tubes 12, are flared as at 22.

Figure 6:
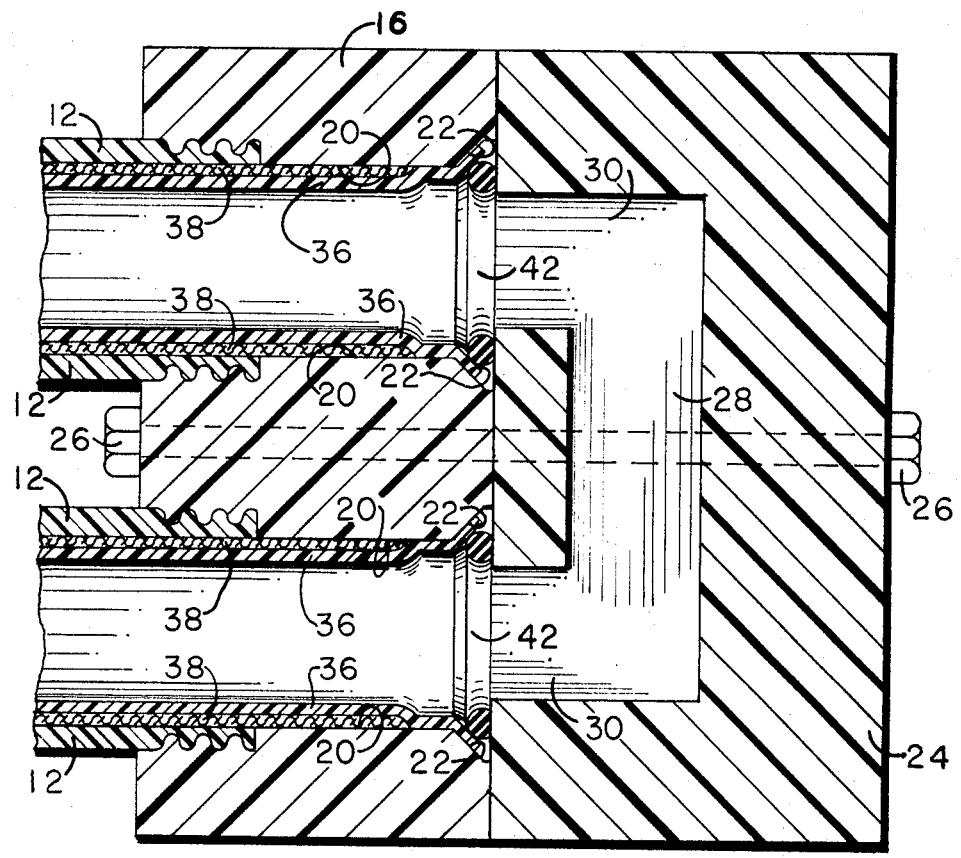
FIG. 6 shows an enlarged detail section of an end plate and flange assembly taken along the line 6—6 of FIG. 3.

Details of the arrangement of flanges 16 and their attached end plates 24 will be more readily apparent from FIG. 6. End plates 24 are attached to flanges 16 by nut and bolt assemblies 26. End plates 24 are provided with internal channels 28 which connect certain of partial bores 30. As will be seen from FIG. 6 one of tubes 12 is connected through partial bore 30, channel 28 and another partial bore 30 to the end of another backing tube 12. In each of end plates 24 is a through bore 32 communicating with an end of a backing tube 12 and which is threaded at its outer end. Thus, from one end of a module liquid can flow through a bore 32 through tubes 12 back and forth and then out a bore 32 in the other end flange, the tubes 12 being connected at their ends through partial bores 30 and connecting internal channels 28 to form a continuous passageway.

Backing tubes 12 are lined with tubular semipermeable membranes 36 around which are wrapped nylon cloth liners 38 to provide lateral flow for liquid passing through membrane 36 to holes 14 drilled through and penetrating the walls of backing tubes 12. Nylon cloth liners 38 may comprise one or several thicknesses of commercial nylon woven cloth.

The semipermeable membrane tubes 36 are flared at their ends to conform to flared portions 22 of the bores in end flanges 16. O rings 42 are placed in the flared portions of membrane tubes 36 being compressed by adjacent faces of end plates 24 to seal the ends of membrane tubes 36 to bore flares 22 and also to seal the connections between these and channels 28 through partial bores 30 and threaded bores 32 in end plates 24.

Figure 5:
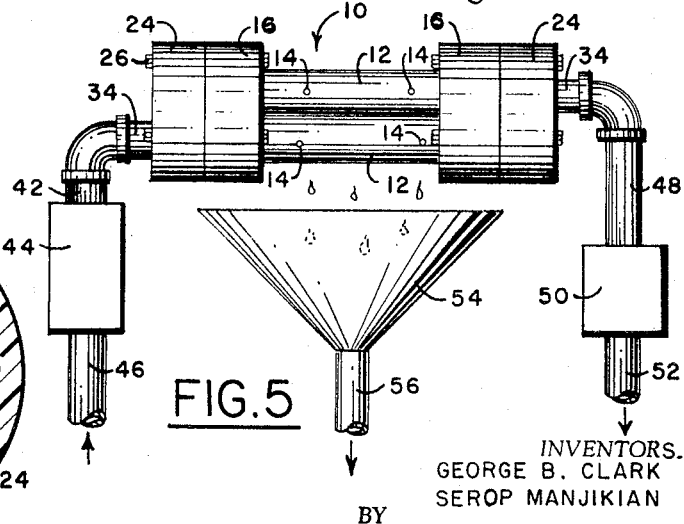
FIG. 5 illustrates, partly diagrammatically, a module according to FIG. 1 incorporated in a reverse osmosis system for solution purification.

In FIG. 5 is shown a module 10 according to this invention incorporated in a reverse osmosis system. Pipes 34 are arranged as inlet and outlet to the module, one being connected by pipe 42 to pump 44 which is supplied with solution to be purified through pipe 46, and the other being connected by pipe 48 to pressure regulator valve 50 which passes a brine concentrate out of the system through pipe 52. Solution passing through the tubular membranes 36, cloth liners 38 and out backing tube holes 14 is gathered as diluate by collector 54 and can be drawn off through pipe 56.

In operation of the apparatus of this invention a solution to be purified, for example, brackish water containing 1,500 parts per million of dissolved salts is supplied to feed pipe 46 at a rate of 100 gallons per day. This solution is pressurized to 600 pounds per square inch by pump 44 and fed to module 10 through pipes 42 and 34. The solution is separated by the semipermeable membranes 36 in backing tubes 12 into a diluate or purified solution gathered in collector 54 at a rate of 80 gallons per day and containing about 500 parts per million of dissolved solids, and a concentrate released by pressure regulator valve 50 containing 5,500 parts per million of dissolved solids and at a rate of 20 gallons per day.

The apparatus of this invention provides a solution treating system in which the osmotic membrane module is extremely compact, efficient and economical to fabricate. The arrangement described, in which the plurality of backing tubes are connected by unitary end elements, enables the tubes to be compactly assembled in side-by-side relationship in close proximity, with their ends connected to provide a continuous elongated membrane lined passageway. This enables a multi-tube system to be constructed without requiring plumbing to connect the ends of the tubes together, and numerous fittings, elbows, nipples or couplings are completely eliminated. Moreover, it will be appreciated that since the unit operates containing solution at high pressure, elimination of a number of joints and connections also eliminates a number of potential leak points. Assembly and fabrication time is obviously reduced when producing a module with an integrated bundle of tubes compared to the same number individually connected by discrete couplings assembled and joined together. Unitary end fittings permit assembly of a module containing a plurality of membrane tubes, which can be handled as a single assembly to be readily incorporated into a complete reverse osmosis system or, if desired, replaced as a unit when necessary. Compactness and ease of membrane unit replacement are particularly important in reverse osmosis systems designed for portability; for specific applications where size, weight and simplicity are significant as in aircraft and marine use; and for household water treatment equipment.

Tubular reverse osmosis membranes have been found to be particularly efficient, compared to other configurations, because liquid flowing down a relatively narrow tube is more readily maintained in a condition of turbulent flow. This prevents formation of a stagnant film or boundary layer next to the membrane surface and which will inevitably contain higher solute content than the bulk of the brine flowing through the system. A high solute content boundary layer substantially decreases membrane efficiency since its ability to pass solvent and reject solute is in part dependent on the concentration of solute in the solution being treated. Thus the high solute content in the boundary layer reduces membrane efficiency and the stagnant liquid prevents contact of fresh solution with the membrane surface. Additionally, and possibly of greater importance, is that an elongated tubular membrane results in a uniformly controlled turbulent flow over the entire membrane surface. There will be no corners in a tube, or dead spots or areas of greater or less liquid flow as may occur when other shapes are used, as for example, when flowing liquid over a flat membrane. According to this invention, the unique advantages of the tubular type membrane are realized in a compact and efficient assembly which can be produced without the complex piping usually associated with connection of a number of tubualr elements and which is well adapted for commercial application.

Use of plastics in fabrication of apparatus for reverse osmosis results in substantially lower cost. Plastics are much easier to drill and fabricate than stainless steel, for example, and their cost is substantially less. Surprisingly, we have found that end flanges and plates cast from compositions described herein are sufficiently strong to withstand the high pressures encountered in reverse osmosis apparatus and these are also not corroded or attacked by saline solutions. Furthermore, as has been pointed out, plastic tubing may be employed advantageously for fabricating membrane backing tubes. It is practical, inexpensive and quite strong enough to withstand pressures and conditions encountered in most reverse osmosis systems. It is most valuable in units operating on brackish waters.

We claim:

1. An improved apparatus for treating a solution by reverse osmosis comprising a plurality of tubular, porous bodies each lined with a semipermeable membrane, means for supplying a solution to be treated under hyperatmospheric pressure to the interior of said membrane-lined bodies, means for discharging a portion of said solution from the interior of said membrane-lined bodies as a concentrate, and means for collecting a portion of said solution which has passed through said membranes and through said membrane-lined bodies as a purified solution, wherein the improvements comprise:
   (a) a plurality of said tubular porous bodies arranged in side-by-side relationship;
   (b) unitary end flanges fixedly attached at the ends of said tubular bodies and having bores communicating with the ends of said tubular bodies, said bores being flared at their outer ends and being overlaid with correspondingly flared end portions of said membranes;
   (c) end plates attached to said flanges; and,
   (d) O ring sealing means interposed between said flared membrane portions and said end plates;
said end flanges and end plates containing means for connecting selected ends of said tubular bodies one to another, and means for connecting other selected ends of said tubular bodies to supply and discharge conduits.

2. Apparatus according to claim 1 in which said end plates contain enclosed channels for connecting selected ends of said tubular bodies through said end flanges one to another and means for connecting other selected ends of said tubular bodies to supply and discharge conduits.

3. Apparatus according to claim 1 in which said end flanges are fixedly attached to the ends of said tubular bodies as structures of synthetic resin composition cast around the ends of said tubular bodies.

4. Apparatus according to claim 1 in which the said tubular bodies are fabricated with holes penetrating their walls and about $1/32$ inch in diameter spaced apart over the surface of said body to provide porosity therein.

5. Apparatus according to claim 4 in which said synthetic resin composition is composed of epoxy resin and aluminum powder.

6. Apparatus according to claim 5 in which end portions of said plastic tubular bodies are circumferentially grooved and the said end flanges are attached as synthetic resin structures cast around said grooved end portions of said tubular bodies.

7. Apparatus according to claim 1 in which said tubular bodies are fabricated of plastic of tensile strength at least 2,000 pounds per square inch.

8. Apparatus according to claim 7 in which the synthetic resin of which said end flanges are cast is characterized by a volume contraction on setting.

References Cited

UNITED STATES PATENTS

| 2,353,489 | 7/1944 | Newcomb | 210—321 |
| 3,228,876 | 1/1966 | Mahon | 210—22 |
| 3,341,024 | 9/1967 | Lowe et al. | 210—490 |

FOREIGN PATENTS

| 295,120 | 4/1965 | Netherlands. |

REUBEN FRIEDMAN, *Primary Examiner.*

F. A. SPEAR, JR., *Assistant Examiner.*

U.S. Cl. X.R.

210—489